July 4, 1939.     G. MAFERA     2,164,615
ALIGNER
Filed Dec. 31, 1937
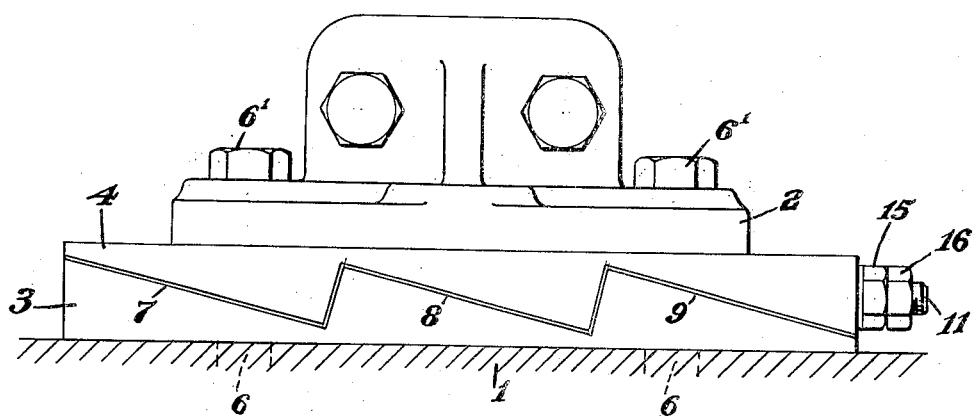
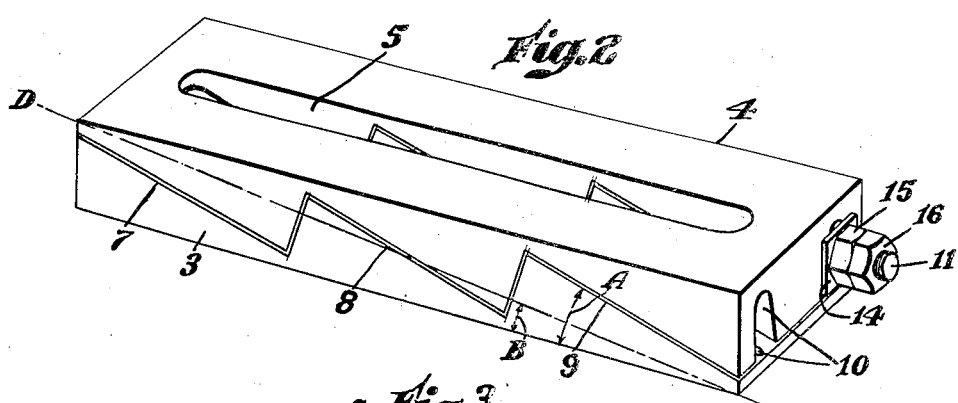
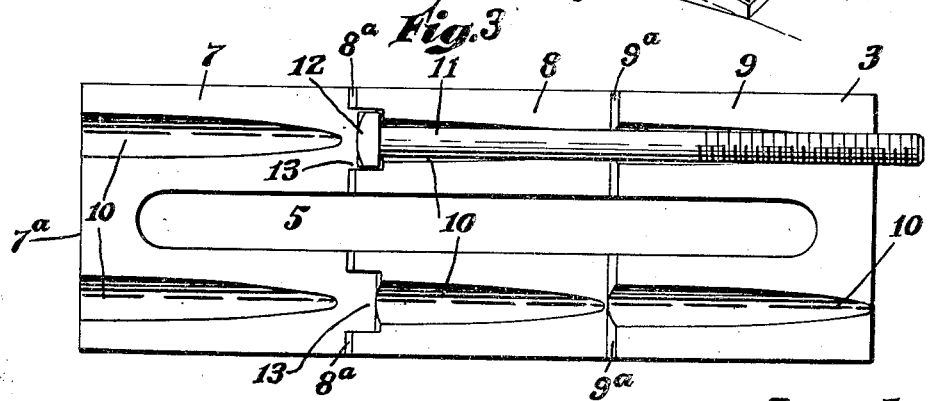
Inventor
Guy Mafera
Spear Rawlings & Spear,
Attorneys Patented July 4, 1939

2,164,615

UNITED STATES PATENT OFFICE 2,164,615

ALIGNER

Guy Mafera, Revere, Mass.

Application December 31, 1937, Serial No. 182,685

3 Claims. (Cl. 254—104)

This invention relates to a novel aligner for such purposes, for example, as the supporting of an engine on its base for accurate alignment with its shaft.

While my invention may be elsewhere employed to advantage, it is particularly suited for use in the installation of marine engines. In such installations, the aligners comprising complementary wedge members are positioned between each bracket and the engine bed so that on movement of one member relative to the other, the vertical position of bracket and accordingly the engine may be accurately adjusted. Such aligners are shown in my co-pending application, Serial Number 153,767, filed July 15, 1937.

My present invention is adapted for use with any bracket and as each wedge member is formed with a plurality of wedge surfaces, maximum adjustments may be quickly made by relatively short movement of one wedge member relative to the other.

In the accompanying drawing, I have illustrated an embodiment of my invention from which the nature of my invention and its advantages will be readily apparent. In the drawing Fig. 1 shows my aligner as installed between an engine bracket and the base.

Fig. 2 is a perspective view of my aligner unit and

Fig. 3 is a plan view of the bottom wedge member.

At 1, I have indicated a portion of the engine base or bed and at 2 an engine bracket of which there are usually four. In order to effect proper alignment of the engine and the propeller shafts, I place one of my aligners between each of the brackets 2 and the engine bed so that by adjustment of each aligner as will be hereinafter explained, the engine may be quickly and accurately aligned.

Each aligner comprises a pair of relatively long wedge shaped members 3 and 4 to be reversed and assembled as shown in Fig. 1 with their wedge faces in contact. Each of the wedge members 3 and 4 is provided with a centrally disposed longitudinal slot 5 of sufficient length to accommodate the lag bolts 6 from any bracket, securing it to the base 1.

I form each of the wedge members 3 and 4 with a plurality, here shown as three wedge surfaces 7, 8, and 9 through each of which extends a longitudinal channel or groove 10 on each side of the slot 5. The grooves 10 are adapted to receive the bolt 11 and while any of the shoulders 7ª, 8ª, or 9ª of the member 3 may be utilized to hold the head 12 of the bolt 11, I prefer to use the shoulder 8ª which is therefore formed with a countersink 13 to prevent rotation of the bolt. Only one bolt 11 is necessary and of course, may be placed in either groove 10. The exposed end of the bolt 11 is provided with an adjusting nut 15. By turning said nut up against the thick end of the top wedge 4, this wedge is adjusted longitudinally over the bottom wedge 3. This adjustment may be held by a lock nut 16.

In order to prevent the adjusting nut 15 from entering the groove 10, I place a square washer 14 between said nut and the thick end of the top wedge. As the adjusting nut 15 is turned to slide the top wedge along the bottom wedge, the lower edge of the square washer rides up along the inclined surface of the bottom wedge, thereby preventing the nut from entering the groove 10 and being prevented by said groove from being further rotated.

My novel aligner is placed between any engine bracket 2 and the engine bed 1 and is retained in place by the lag bolts 6. It is then only necessary to turn the adjusting nut 15 to slide the top wedge longitudinally along the bottom wedge until the engine shaft is accurately aligned with the propeller shaft. The adjustment is held by tightening the lock nut 16 and the nuts 6' on the lag bolts 6. Because of the plurality of wedge surfaces, the adjustment of each aligner is effected on short relative movement of the wedge members 3 and 4.

It will be noted that the angle of each wedge surface is greater than the angle formed by the base of the aligner and a diagonal from said base to the top of the aligner. This is indicated in Fig. 2 wherein the dotted line D is the diagonal and the angle indicated at A is greater than the angle indicated at B.

This construction is preferred as it permits greater adjustments of the element to be supported relative to its base on shorter relative movements of the members 3 and 4 than would be possible were the angle A equal to the angle B.

If desired, the wedge members 3 and 4 may be identical. As shown in the drawing, the only difference between them is the countersinks 13 on the shoulder 8ª of the member 3 and those may be omitted or elsewhere located.

What I therefore claim and desire to secure by Letters Patent is:

1. An aligner for adjusting a machine element relative to its base, said aligner comprising a pair of elongated members each of said members having one surface formed with a triplicate of identical wedge surfaces having shoulders, said surfaces adapted to be disposed in mutual contact, said members having aligned slots to permit attachment for said element to said base through said aligner, each of said surfaces having a longitudinal groove through said wedge surfaces, said grooves defining on assembly of said member an aperture through said aligner one end of each of said members comprising the shoulder of one of said wedge surfaces, the other end of each of said members comprising the thin end of another wedge surface, the shoulder of an intermediate wedge surface of one of said members having countersinks, a bolt in said aperture, the head of said bolt being held in one of said countersinks, a nut to coact with the end shoulders of the other of said members, and a square washer between said nut and said shoulder, said washer being of greater width than said groove, whereby said nut is held out of said groove as it is advanced on said bolt.

2. In an aligner for adjusting a machine element relative to its base, a pair of members having wedge surfaces presenting shoulders, said surfaces being disposed in mutual contact, each of said surfaces having a longitudinal groove defining on assembly of said members an aperture through said aligner and means coacting with each of said members to effect relative movement thereof, said means comprising a bolt in said aperture, the head of said bolt bearing against one shoulder of one member, and a nut to coact with one shoulder of the other member and a washer intermediate said nut and said last-named shoulder, said washer being of a size relative to said groove to hold said nut out of said groove as said nut is advanced on said bolt.

3. An aligner for adjusting a machine element relative to its base, said aligner comprising a pair of substantially identical elongated members, each of said members having a plurality of identical wedge portions on one of its surfaces, the thick end of one of said portions establishing one end of said member and the thin end of another of said portions establishing the other end of said member, each of said members having a groove extending through said wedge portions parallel to said base, and a slotted bolt aperture adjacent said groove, said members being assembled with their wedge portions in mutual contact with said groove establishing a bolt aperture through said aligner, a bolt in one of said apertures, said apertures being formed intermediate the ends of said aligner to hold the head of said bolt against rotation against a thick end of one wedge portion on one of said members, a nut on said bolt to coact with the thick end of said other member whereby said aligner may be quickly and easily adjusted upon short relative movement of said members.

GUY MAFERA.